(No Model.)
2 Sheets—Sheet 1.
R. C. GREENERD.
MACHINE FOR APPLYING AND REMOVING COLLARS FROM SHAFTS.
No. 464,316. Patented Dec. 1, 1891.
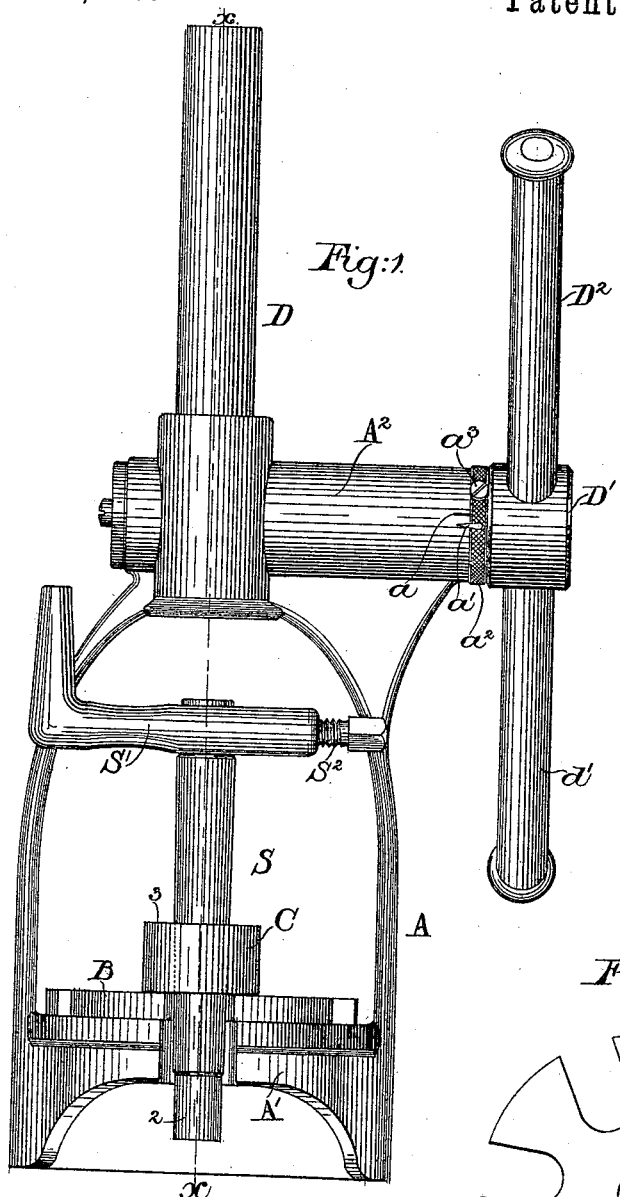
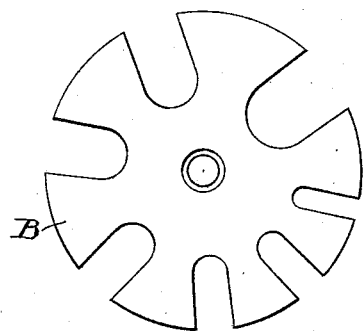
Witnesses:
Louis N. Gowell
Edward F. Allen
Inventor:
Robert C. Greenerd
by Crosby & Gregory attys.

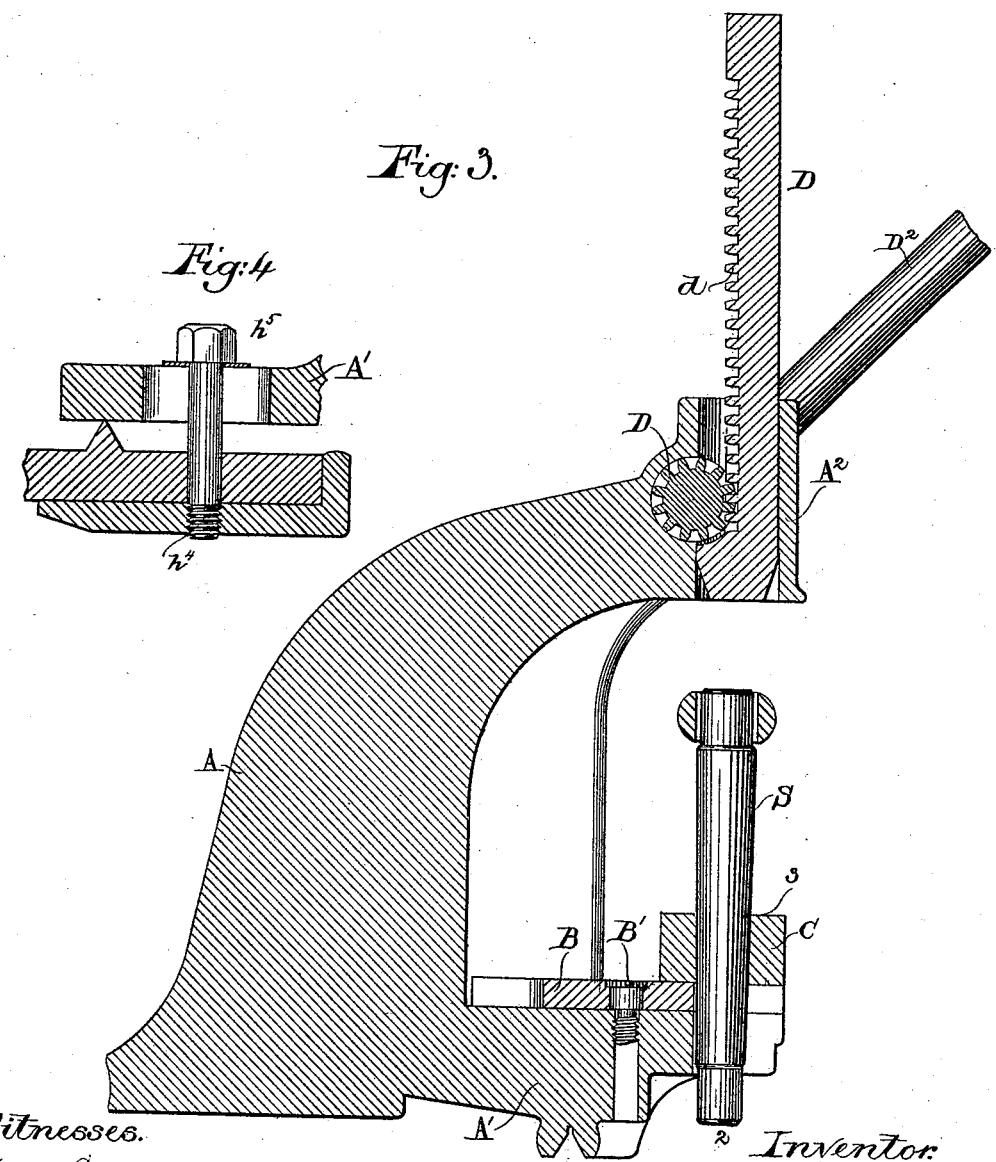

UNITED STATES PATENT OFFICE.

ROBERT C. GREENERD, OF BOSTON, MASSACHUSETTS.

MACHINE FOR APPLYING AND REMOVING COLLARS FROM SHAFTS.

SPECIFICATION forming part of Letters Patent No. 464,316, dated December 1, 1891.

Application filed July 1, 1891. Serial No. 398,108. (No model.)

*To all whom it may concern:*

Be it known that I, ROBERT C. GREENERD, of Boston, county of Suffolk, State of Massachusetts, have invented an Improvement in Machines for Applying and Removing Collars from Shafts or Spindles, of which the following description, in connection with the accompanying drawings, is a specification, like letters and figures on the drawings representing like parts.

In the manufacture of machinery there are many collars which have to be turned true in a lathe. As this work is now ordinarily done, the collar to be turned true is laid on an anvil or block over a hole. One end of the spindle is put into the hole in the collar, and with a mallet striking upon the upper end of the shaft or spindle the latter is driven into the collar. In this process, which is slow and laborious, the mallets are quickly worn and split or broken and the centering hole is frequently filled.

To save time and cost of mallets and at the same time to place the collars in just the proper position on the shaft or spindle, I have devised the machine to be described.

The shaft or spindle on which the collar is forced has attached to it at one end a lathe-dog, and the ends of the shaft or spindle have center cavities for the points of the head and tail stocks of the lathe. The dog is usually applied to one end of the shaft or spindle before the other end thereof is placed in the collar, and when the shaft or spindle is to be driven out of the turned collar the dog is removed, or otherwise the end of the shaft or spindle having the dog could not be entered into the usual hole in the block or anvil, while the operator with his mallet strikes and drives the spindle out of the turned collar.

My invention comprehends an open-throated base or support for the collar, so that the spindle may be put into the throat laterally with the collar attached and not remove the dog, and a forcing device to gradually force a shaft or spindle into or out from a collar, and that without necessarily removing the dog.

Figure 1, in front elevation, shows a machine for applying and removing collars from spindles; Fig. 2, a detail of the auxiliary support which I prefer to use; Fig. 3, a section in the line $x$, Fig. 1; and Fig. 4 is a detail showing the lower or left-hand end of the base of the frame, which is broken off from Fig. 3, and part of the lathe-bed.

The frame-work A, of suitable shape to support the working parts, has a base A', and preferably the base will be provided with an auxiliary supporting-plate B, through which I have shown as extended a stud or pivot screw B'. This base or plate, in accordance with my invention, has an open-sided throat to enable the shaft or spindle S to be entered into said throat laterally, as shown in the drawings. I prefer to use the auxiliary-movable plate B, for the reason that it may be provided with a series of throats of different sizes, as shown in Fig. 2, to adapt the machine to shafts or spindles of different diameters and aid in guiding and positioning them; but it will be obvious that the plate B might be omitted and the collar C be supported directly on the base, the shaft or spindle entering the open throat of the base.

The upper part of the machine has a forcing device, which in this embodiment of my invention is shown as a rod D, having teeth $d$ engaged by teeth cut on a shaft D', represented as provided with a hand-lever $D^2$ by which to rotate the said shaft.

In practice I leave the end $d'$ of the lever $D^2$ a little longer or heavier than its other end to aid in keeping the rod D in its elevated position. The rod D is extended through a bearing $A^2$ of the frame.

I have provided the apparatus with an indicator or index to determine the position to which the rod D descends, and in this instance of my invention I have shown a scale-mark $a$ on the bearing, and co-operating with it is a pointer $a'$, attached to a collar $a^2$, the said collar being adjustable on the shaft D' by a screw $a^3$. The operator by adjusting the collar may determine the position of the lower end of the forcing device when the finger $a'$ arrives opposite the scale $a$.

In use, let S represent a spindle having at its ends usual center points to be held in a lathe, and S' a dog secured on the shaft near one end by a screw $S^2$. The end 2 of the spindle is inserted into the collar C to be forced on the said spindle, and the spindle, with the collar loosely applied to it, is put into position in the apparatus, as shown, and then the operator by engaging the handle $D^2$ and rotating the shaft $D'$ causes the forcing device to be thrown down against the upper end of the spindle, pushing the spindle into the collar to the desired point. This done, the forcing device is elevated, and the spindle, with its firmly-attached collar, is removed and put into the lathe to have the collar turned true. This done, the operator puts the spindle back again into the open throat, but this time with the face 3 of the collar down or resting on the plate or base, and the forcing device is again moved down, but this time it acts against the end 2 of the spindle and forces the latter out of the turned collar. In this way the centered ends of the spindle are never choked or battered, mallets are unnecessary, and the dog may be kept on the spindle.

In the old way the dog had to be removed after each collar was turned and before another was put on the spindle.

It is not intended to limit this invention to the exact form of forcing device shown, as the shape might be variously modified without departing from my invention.

It will be noticed that the lower part or base of the frame is provided with a groove or guide $h$, (see Figs. 3 and 4,) which embraces one of the usual tracks or guideways of the lathe-bed, the other end of the base resting on the oppositte side of the top of the lathe-bed, so that the apparatus may stand firmly upon the lathe-bed near one end, the base being connected to the lathe-bed by a screw $h^4$ and bar-nut $h^5$.

I claim—

1. A machine for applying collars to and removing collars from spindles, the same comprehending an open-sided throat or support to receive the spindle laterally and support the collar thereon, a forcing device, and means to actuate the same, whereby the spindle and collar are forced together firmly to enable the collar to be turned in a lathe, substantially as described.

2. A movable plate having a series of open throats of different sizes to receive a spindle laterally and sustain a collar thereon, and a support for said plate having an open side throat therein, and a forcing device to act on the end of the spindle held laterally in one of the throats of said plate, combined with means for actuating said forcing device, substantially as described.

3. A support for a collar and open for the reception of a spindle, and a forcing device and actuating mechanism therefor, combined with a scale to determine the extent to which the spindle is forced into the collar, substantially as described.

4. In an apparatus for forcing or applying collars to spindles, an open-throated support connected to or forming part of a frame-work provided with a groove to fit upon the track of a lathe-bed, combined with a forcing device to act upon the spindle when applying a collar to or removing a collar from said spindle, substantially as described.

In testimony whereof I have signed my name to this specification in the presence of two subscribing witnesses.

ROBERT C. GREENERD.

Witnesses:
GEO. W. GREGORY,
FRANCES M. NOBLE.